(No Model.)  2 Sheets—Sheet 1.
J. B. F. HERRESHOFF.
APPARATUS FOR CONCENTRATING SULPHURIC ACID.
No. 369,790. Patented Sept. 13, 1887.
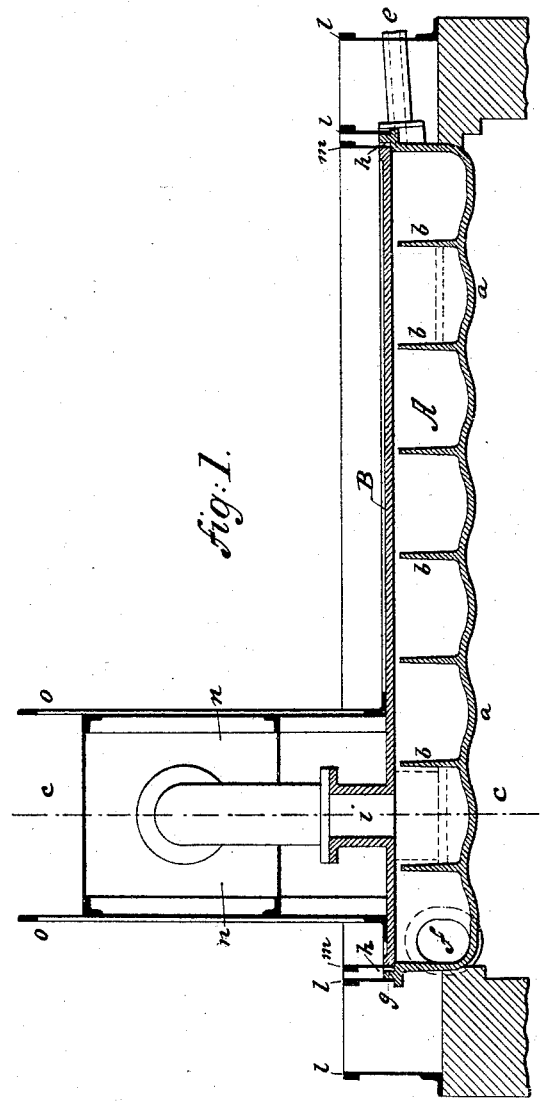
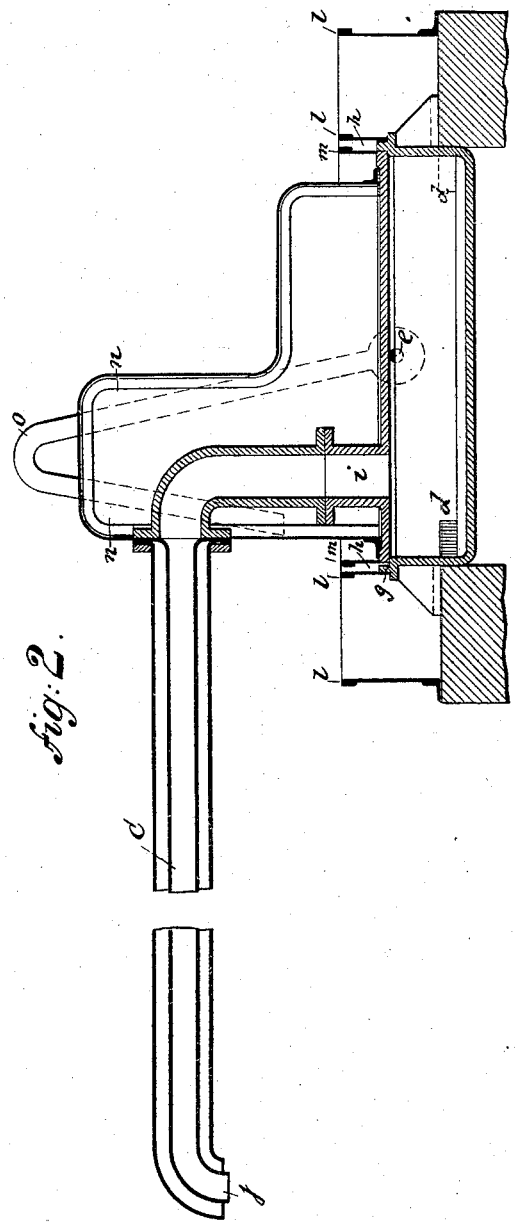
WITNESSES:
John M. Speer.
Gustav Schneppé.
INVENTOR
J. B. F. Herreshoff
BY Briesen & Steele
ATTORNEYS.

(No Model.) 2 Sheets—Sheet 2.
J. B. F. HERRESHOFF.
APPARATUS FOR CONCENTRATING SULPHURIC ACID.
No. 369,790. Patented Sept. 13, 1887.
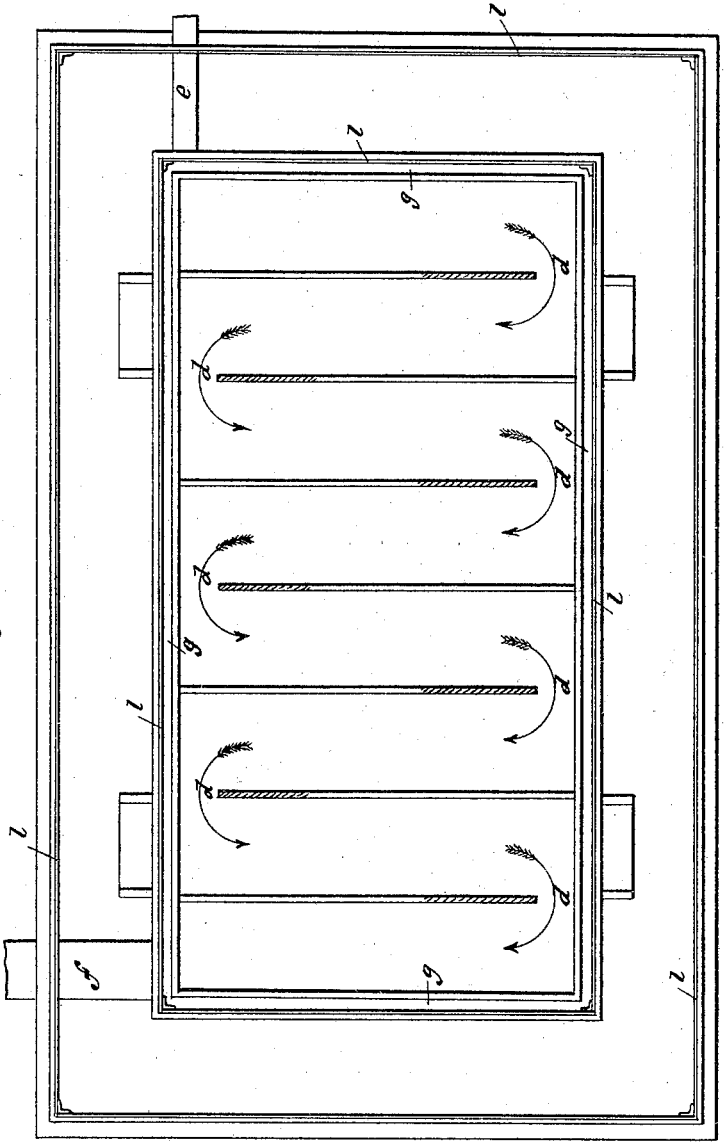
WITNESSES:
John M. Speer.
Gustav Schneppe.
INVENTOR
J. B. F. Herreshoff
BY Briesen & Steele
ATTORNEYS.

UNITED STATES PATENT OFFICE.

JOHN BROWN FRANCIS HERRESHOFF, OF BROOKLYN, NEW YORK, ASSIGNOR TO HIMSELF, GEORGE H. NICHOLS, AND WILLIAM H. NICHOLS, ALL OF SAME PLACE.

APPARATUS FOR CONCENTRATING SULPHURIC ACID.

SPECIFICATION forming part of Letters Patent No. 369,790, dated September 13, 1887.

Application filed May 17, 1886. Serial No. 202,405. (No model.)

*To all whom it may concern:*

Be it known that I, JOHN BROWN FRANCIS HERRESHOFF, a resident of Brooklyn, in the county of Kings and State of New York, have invented an Improved Apparatus for Concentrating Sulphuric Acid, of which the following is a full, clear, and exact description, reference being made to the accompanying drawings, in which—

Figure 1 is a vertical longitudinal section of my improved apparatus for concentrating sulphuric acid. Fig. 2 is a vertical cross-section of the same, on the line *c c*, Fig. 1. Fig. 3 is a plan view of the same.

My invention relates to a new construction of pan for evaporating sulphuric acid and concentrating the residue; and it consists, first, in making the body of the pan with an undulating bottom and with upright walls or partitions that are placed upon the crests of the undulations, and, secondly, in a new construction of cover for the pan.

In the drawings, the letter A represents the body of the pan. The same has an undulating bottom, *a*, which on the crest of each undulation carries a transverse partition, *b*; hence between every two partitions the bottom sags downward to facilitate the collection of sediments. These partitions have openings *d* at their alternate ends, so that the liquid passing from the inlet-pipe *e* to the outlet-pipe *f* of the pan will run in a zigzag course through the same, as is indicated by the arrows in Fig. 3.

The inlet-pipe *e* leads into the upper part of the pan, while the outlet-pipe *f* extends from the lower part of the pan. This pan is provided with a cover, B, which is made of iron, and which sets in flanges *g*, that are formed in the vertical walls of the pan A.

The space between the flanges *g* and the edge of the cover B is filled with a grout, *h*, of Portland cement or like material. It will be noticed from Figs. 1 and 2 that the ribs or partitions *b* of the pan do not reach contact with the under side of the cover B. This allows the acid-vapors to escape by a pipe, *i*, which extends upward from the cover B, as shown, and leads into a condenser, C, from which the products of condensation escape at *j* as a pure acid.

The pan itself is surrounded by a sheet-iron or other double wall, *l*, which contains mineral wool or other bad conductor of heat, and the cover B is also, on its upper side, provided with a sheet-metal extension, *m*, which contains mineral wool or the like, so as to confine the heat, as far as practicable, within the pan. The sheet-metal covering is also extended, as at *n*, around the pipe *i*, for the purpose of preventing the vapors from condensing before they reach the condenser C. If any actual acid or product of condensation came into contact with the iron cover B, it would be liable to destroy it or eat into it; but my cover being protected by the non-conducting covering, so that no heat is allowed to escape, will not be brought in contact with the products of condensation; hence the production of an iron cover for a pan in which sulphuric acid is exposed to heat is deemed an important invention, as no chemical action takes place between the iron cover and hot acid-vapor. The advantage of this construction, so far as the iron cover is concerned with its non-conducting covering, is that a great saving of cost is obtained, platinum covers being heretofore deemed essential; and my iron cover, moreover, admits of a ready inspection of the contents of the pan, as the cover with its non-conducting covering is easily lifted off. A suitable handle, *o*, is attached to the cover for this purpose.

When the pan is opened by lifting off the cover, its contents can be easily inspected and the pan itself repaired.

Again, the iron cover being flat and as near the surface of the boiling acid as practicable—say four or five inches—it will be quite as hot as the boiling acid, and will therefore radiate much heat back into the acid instead of radiating the heat away from the pan, which is the case with the usual platinum cover. By maintaining a very hot cover on the pan, as described, I also save considerable fuel.

I claim—

1. The sulphuric-acid pan A, having flanges $g$, combined with the flat iron cover B, resting on said flanges, and with the cement grout $h$, as described.

2. The pan A, having double walls $l\,l$ around it, combined with the iron cover B, having non-conducting upper chamber, $m$, pipe $i$, and non-conducting chamber $n$ around said pipe, as and for the purpose specified.

JOHN BROWN FRANCIS HERRESHOFF.

Witnesses:
FRANK BURBIDGE,
C. H. JOÜET.